March 5, 1957
E. W. SOWARDS
2,783,871
AUTOMATIC COMPENSATING ROLLER FOR BELTS
Filed May 3, 1955
2 Sheets-Sheet 1
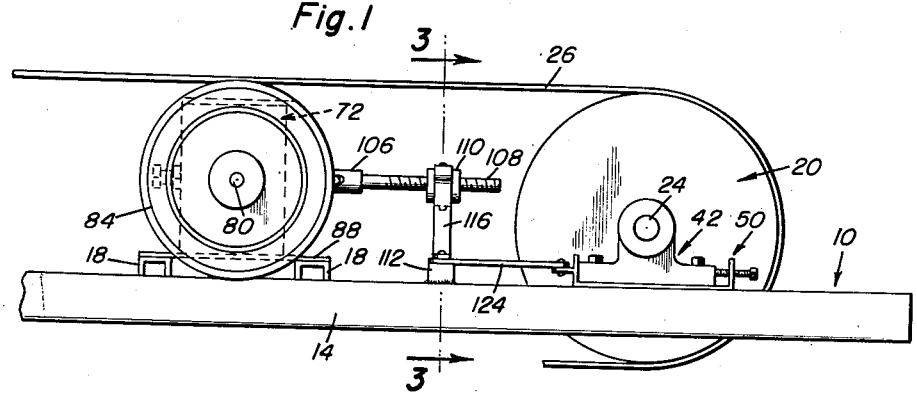
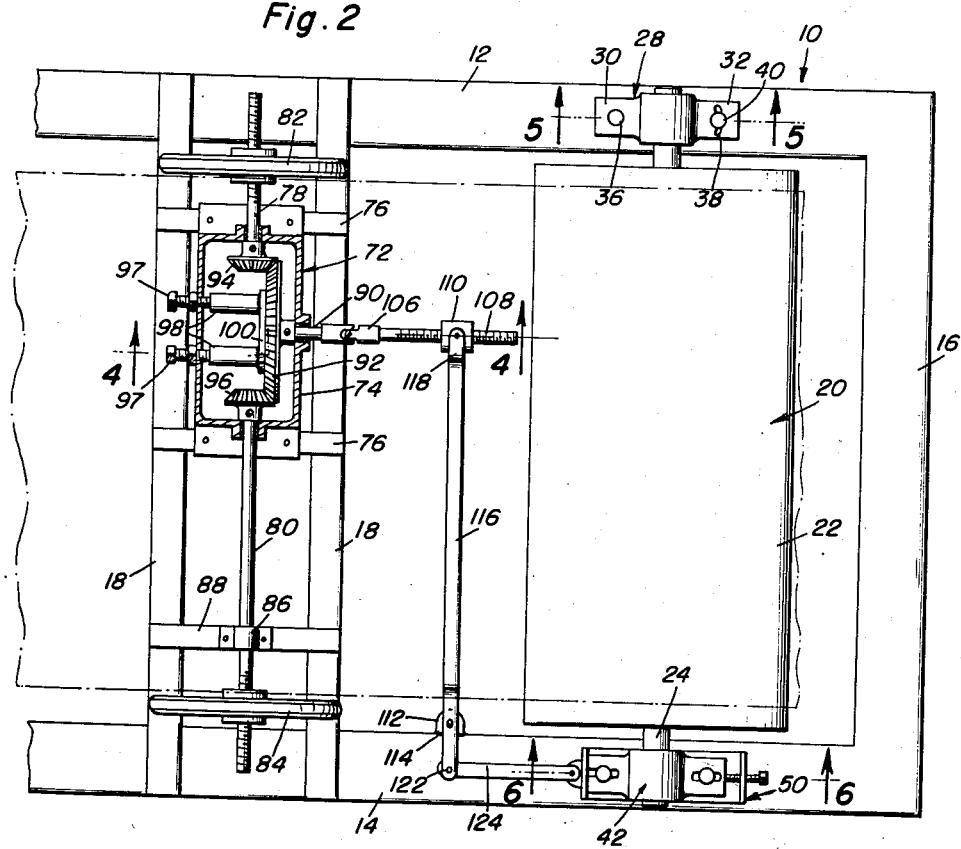
Edward W. Sowards
INVENTOR.

March 5, 1957
E. W. SOWARDS
2,783,871
AUTOMATIC COMPENSATING ROLLER FOR BELTS
Filed May 3, 1955
2 Sheets-Sheet 2
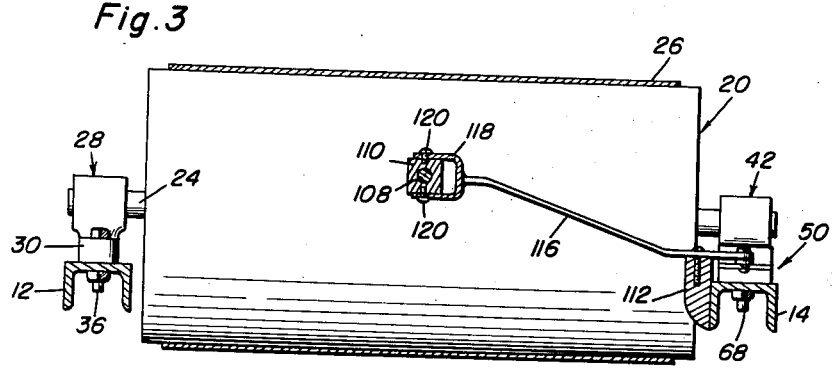
Fig.3
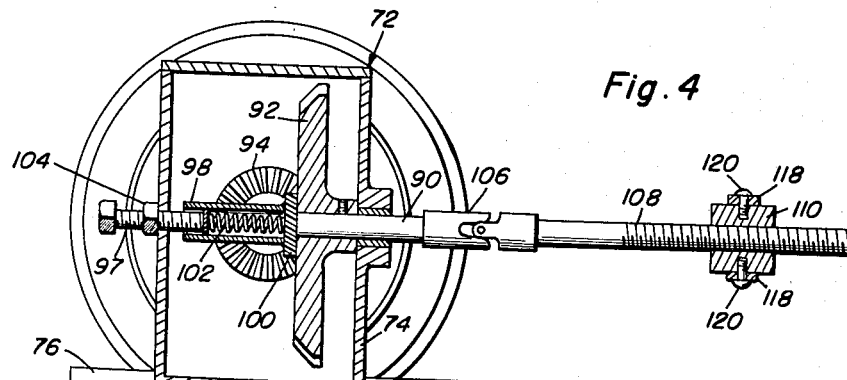
Fig.4
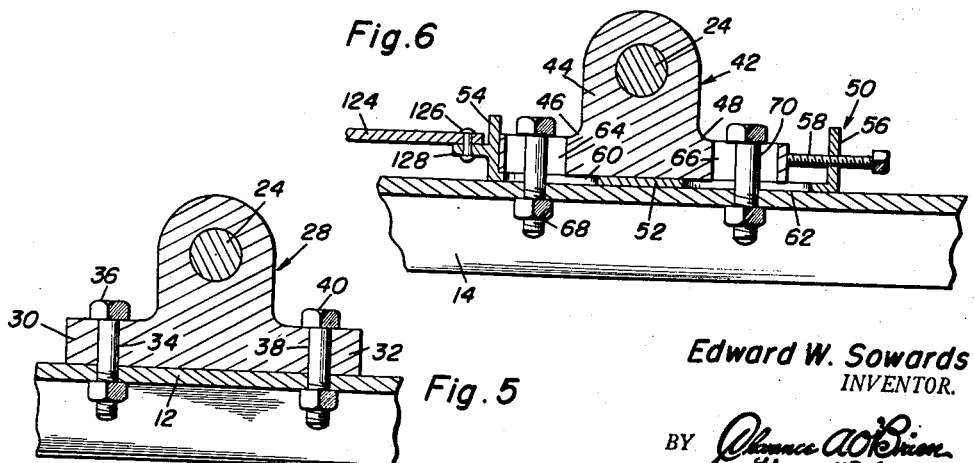
Fig.6
Fig.5
Edward W. Sowards
INVENTOR.

United States Patent Office 2,783,871
Patented Mar. 5, 1957

2,783,871

AUTOMATIC COMPENSATING ROLLER FOR BELTS

Edward W. Sowards, Campbell, Calif.

Application May 3, 1955, Serial No. 505,610

1 Claim. (Cl. 198—202)

This invention relates in general to new and useful improvements in roller assemblies for conveyor belts, and more specifically to an automatic compensating roller for conveyor belts.

Due to the length of conveyor belts and the spacing between supporting idler rollers thereof, there is a tendency for the conveyor belts to attempt to shift transversely of the belt rollers. This is particularly true when the belts are unevenly loaded. If means are not provided for returning the belts to their proper aligned positions with respect to the rollers, the belts will both wear unevenly, and have a tendency to run off the rollers and dump their loads.

It is therefore the primary object of this invention to provide a compensating roller for automatically aligning the misaligned portion of a conveyor belt with the supporting rollers therefor, the compensating roller being provided with means for automatically actuating the same.

Another object of this invention is to provide an improved compensating roller for conveyor belts, the compensating roller being pivotally mounted and there being provided means engageable with the conveyor belt upon misalignment thereof for automatically pivoting the compensating roller in a direction opposite to the misalignment, whereby the conveyor belt is fed back into alignment with the other rollers by the compensating roller.

A further object of this invention is to provide an improved mounting for a compensating roller, the mounting including a bearing at one end of the roller pivotally connected to a supporting frame, and a second bearing at the opposite end of the roller slidably mounted with respect to the supporting frame, the bearing being mounted in a suitable shoe whereby replacement of the second bearing may be facilitated as found necessary.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of an idler compensating roller for an endless conveyor belt, the roller being disposed at one end of the belt assembly and being provided with means for automatically pivoting or shifting the same to properly align the belt entrained thereover;

Figure 2 is a fragmentary top plan view of the compensating belt roller and the automatic mechanism for actuating the same, the belt being shown in broken lines and a portion of a gear box housing being broken away and shown in section in order to clearly illustrate the details of the operating mechanism for the compensating roller;

Figure 3 is an enlarged transverse vertical sectional view taken substantially upon the plane indicated by the section line 3—3 of Figure 1 and shows the general details of the operating linkage for effecting pivoting of the compensating roller;

Figure 4 is an enlarged fragmentary vertical sectional view taken substantially upon the plane indicated by the section line 4—4 of Figure 2 and shows the details of the drive means for effecting pivoting of the compensating roller;

Figure 5 is an enlarged fragmentary sectional view taken substantially upon the plane indicated by section line 5—5 of Figure 2 and shows the details of the pivotal mounting of a first bearing for the compensating roller; and Figure 6 is an enlarged fragmentary vertical sectional view taken substantially upon a plane indicated by the section line 6—6 of Figure 2 and shows the details of a mounting of a second bearing for the compensating roller.

Referring now to the drawings in detail, it will be seen that there is illustrated a conveyor belt roller supporting frame which is referred to in general by the reference numeral 10. The supporting frame 10 includes elongated frame rails 12 and 14 which are connected together at one end by a transverse frame member 16. Intermediate portions of the frame rails 12 and 14 are also connected together by intermediate frame members 18.

Extending between the frame rails 12 and 14 and supported thereon is a compensating conveyor belt roller 20. The roller 20 includes a roller portion 22 and a mounting shaft 24. The roller 20 is an end idler roller and has entrained thereover a conveyor belt 26.

In order to facilitate the mounting of the compensating roller 20 on the frame 10, there is provided a first bearing 28 which is in the form of a pillow block. The first bearing 28 includes a pair of mounting flanges 30 and 32. The mounting flange 30 is provided with a bore 34 through which passes a bolt 36, as is best illustrated in Figure 5. The bolt 36 passes through the frame rail 12 and functions as a pivot for the first bearing 28. The flange 32 is provided with an arcuate slot 38 in which there is received a securing bolt 40. The securing bolt 40 loosely passes through the slot 38, and serves to hold the flange 32 down with respect to the frame rail 12.

Referring now to Figures 2 and 6 in particular, it will be seen that the opposite end of the shaft 24 is mounted in a second bearing which is referred to in general by the reference numeral 42. The second bearing 42 includes a bearing housing 44 having mounting flanges 46 and 48. The bearing housing 44 is seated in a channel-shaped shoe which is referred to in general by the reference numeral 50.

The shoe 50 includes a web 52 which is horizontally disposed and which slidably rests upon the frame rail 14. The shoe 50 also includes a pair of flanges 54 and 56 at opposite ends of the web 52. The end of the flange 42 is disposed in abutting engagement with the inner surface of the flange 54, and the end of the flange 48 of the bearing housing 44 is clampingly engaged by a clamp screw 58 adjustably carried by the flange 56 to clamp the bearing housing 44 in the shoe 50. The clamp screw 58 is adjustable, whereby bearing housings of different sizes may be utilized.

Formed in the web 52 are longitudinally spaced, elongated longitudinal slots 60 and 62. The slots 60 and 62 are aligned with slots 64 and 66 formed in the flanges 46 and 48, respectively. Passing through the slots 60 and 64 and 62 and 66 are hold-down bolts 68 and 70, respectively. The bolts 68 and 70 pass through the frame rail 14 and mount the shoe 50 and the bearing housing 44 for guided sliding movement.

In order that the compensating roller 20 may be automatically shifted in order to align the conveyor belt 26 when it becomes misaligned, there is carried by the frame members 18 a differential gear box assembly which is referred to in general by the reference numeral 72. The differential gear box assembly 72 includes a gear box 74 which is mounted upon a pair of frame members 76 extending between the frame members 18.

Suitably journaled in bearings in inner ends of the gear box 74 are operating shafts 78 and 80. The shafts 78 and 80 extend from opposite ends of the gear box 74 and are disposed transversely of the longitudinal axis of the supporting frame 10. Adjustably mounted on the operating shaft 78 is a wheel 82. A similar wheel 84 is adjustably mounted on the free end of the operating shaft 80. Inasmuch as the operating shaft 80 is quite long and the wheel 84 is mounted a distance from the gear box 74, an intermediate portion of the operating shaft 80 is supported by a bearing 86 mounted on a frame member 88 which extends between the frame members 18.

The front wall of the gear box 74 facing the compensating roller 20 is provided with a bearing which has suitably journaled therein a driven shaft 90. The driven shaft 90 has mounted thereon a ring gear 92. Engaged with the ring gear 92 are drive gears 94 and 96 carried by the inner ends of the operating shafts 78 and 80, respectively.

Referring now to Figures 2 and 4 in particular, it will be seen that there is carried by the side wall of the gear box 74 remote from the compensating roller 20 a pair of adjusting screws 97. The adjusting screws 97 are received within sleeves 98 carried by a plate 100. The inner ends of the adjusting screws 97 are engaged with springs 102 and the adjusting screws 97 are retained in adjusted positions by lock nuts 104. It will be readily apparent that the adjusting screws 97 serve to position the ring gear 92 with respect to the drive gears 94 and 96.

Connected to the driven shaft 90 by a universal coupling 106 is a threaded shaft 108. Threadedly engaged on the threaded shaft 108 for travel therealong is a follower 110.

Mounted on the frame rail 14 intermediate the frame members 18 and the compensating roller 20 is a mounting member 112. Carried by the mounting member 112 is a pivot pin 114 on which there is pivotally mounted an operating link 116. One end of the operating link 116 is bifurcated, as at 118, and is pivotally connected to the follower 110 by suitably pivots 120, as is best illustrated in Figure 4.

Pivotally connected to the other end of the link 116 by means of a pivot pin 122 is a drag link 124. The drag link 124 is connected by a pin 126 to an ear 128 carried by the flange 54 of the shoe 50.

Inasmuch as the wheels 82 and 84 are spaced apart a distance slightly greater than the width of the conveyor belt 26, they are normally out of engagement with the conveyor belt. However, in event the conveyor belt 26 should shift transversely of the compensating roller 20, it will become engaged with one of the wheels 82 and 84. Assuming that the conveyor belt comes into engagement with the wheel 82, it will then proceed to drive that wheel with the result that the operating shaft 78 will be rotated to drive the differential ring gear 92. This will result in the rotation of the driven shaft 90 and the threaded shaft 108. The rotation of the threaded shaft 108 results in the movement of the follower 110 therealong to pivot the link 116. Pivoting of the link 116 results in the shifting of the shoe 50 and the second bearing 42 to effect shifting of the axis of the compensating roller 20 in a clockwise direction about the pivot pin 36 to urge the conveyor belt 26 back into alignment. Inasmuch as the wheel 82 will be driven immediately upon a slight misalignment of the conveyor belt 26, only a slight pivoting of the compensating roller 20 will be necessary and the conveyor belt 26 will be immediately returned to its alignment.

Although the compensating roller 20 has been illustrated as an end roller for the conveyor belt, it is to be understood that it can be either an intermediate idler roller or a drive roller, as deemed necessary.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

An automatic compensating roller assembly for belts comprising a supporting frame including longitudinal frame members and a transverse frame section extending between and connected to said longitudinal frame members, a main belt supporting roller extending transversely between said longitudinal frame members in spaced relation from said transverse frame section, first and second bearing assemblies supporting opposite ends of said belt roller, said first bearing assembly including mounting means for pivotally mounting said first bearing assembly on one of said longitudinal frame members, said second bearing assembly including a shoe slidably mounted on the other of said longitudinal frame members, a bearing housing releasably clamped in said shoe whereby the bearing housing may be selectively replaced, fasteners carried by said other longitudinal frame member restraining said shoe and said bearing housing for movement along said other longitudinal frame member only, a differential gear box mounted on said transverse frame section, said differential gear box including a ring gear and ring gear shaft, pinion gears meshed with said ring gear, said pinion gears having connected thereto shafts extending transversely of said supporting frame, wheels carried by said pinion gear shaft, said wheels being disposed below the plane of the belt being spaced apart a distance slightly greater than the width of the belt, said wheels being aligned with said belt roller, a shifting arm connected to said shoe, said shifting arm being pivotally mounted intermediate the ends, and a threaded connection between said ring gear shaft and said shifting arm whereby when said ring gear shaft is rotated, said shifting arm is pivoted to pivot said belt roller.

References Cited in the file of this patent
UNITED STATES PATENTS

| 906,877 | Harcourt | Dec. 15, 1908 |
| 1,114,022 | Olbrantz et al. | Oct. 20, 1914 |
| 1,912,246 | Barrett | May 30, 1933 |
| 2,075,111 | Gulliksen et al. | Mar. 30, 1937 |

FOREIGN PATENTS

| 318,018 | Great Britain | Aug. 29, 1929 |